United States Patent [19]

Moog

[11] 4,200,168
[45] Apr. 29, 1980

[54] APPARATUS FOR ROLL-STABILIZING A VEHICLE

[76] Inventor: William C. Moog, Hillcrest Rd., East Aurora, N.Y. 14052

[21] Appl. No.: 894,475

[22] Filed: Apr. 7, 1978

[51] Int. Cl.$^2$ ............................................ C60R 27/00
[52] U.S. Cl. ................................. 180/282; 104/118; 105/141; 114/122; 114/124
[58] Field of Search .................... 180/21, 30, 218, 219, 180/282, 313; 114/122, 124, 121; 105/141; 104/118

[56] References Cited

U.S. PATENT DOCUMENTS

| | | | |
|---|---|---|---|
| 1,362,024 | 12/1920 | McKee | 180/30 |
| 1,571,264 | 2/1926 | Gretsch | 114/122 |
| 1,853,069 | 4/1932 | Minorsky | 114/124 |
| 2,931,389 | 4/1960 | Moog, Jr. et al. | 137/625.62 |
| 3,023,782 | 3/1962 | Chaves, Jr. et al. | 137/85 |
| 3,124,007 | 3/1964 | Swinney | 74/5.22 |
| 3,228,423 | 1/1966 | Moog, Jr. | 137/625.62 |
| 3,277,840 | 10/1966 | Li | 180/209 X |
| 3,373,832 | 3/1968 | Summers | 180/226 |

Primary Examiner—John J. Love
Assistant Examiner—Milton L. Smith
Attorney, Agent, or Firm—Sommer & Sommer

[57] ABSTRACT

Apparatus for roll-stabilizing a vehicle broadly includes a compound physical pendulum operatively arranged to sense the lateral and angular acceleration of the vehicle attributable to an applied disturbance torque, and an inertia wheel arranged to be accelerated in the appropriate angular direction to exert a reaction torque on the vehicle to oppose the disturbance torque. The compound physical pendulum has a rigid dumbbell-shaped member mounted for frictionless pivotal movement between opposing discharge nozzles of a hydraulic amplifier. The hydraulic amplifier produces a differential control pressure in response to the acceleration forces acting on the pendulum, and this control pressure is used to operate a servovalve. The servovalve produces a drive pressure which is supplied to a hydraulic motor to accelerate the inertia wheel in the appropriate angular direction. The apparatus may further include static balance means for shifting a weight or fluid mass transversely of the vehicle to correct a static imbalance condition.

8 Claims, 2 Drawing Figures

APPARATUS FOR ROLL-STABILIZING A VEHICLE

BACKGROUND OF THE INVENTION

1. Field of the Invention

The present invention relates generally to apparatus for roll-stabilizing a vehicle, and more particularly to improved apparatus for sensing the application of an overturning moment to the vehicle, and for exerting a reaction torque on the vehicle to oppose such overturning moment.

2. Description of the Prior Art

Persons skilled in this art have recognized that some vehicles, particularly motorcycles, are inherently unstable, and have attempted to provide apparatus for roll-stabilizing such vehicles.

One example of such earlier apparatus is shown in U.S. Pat. No. 3,124,007 which discloses means for sensing the vertical with a gyro, and means for shifting a weighted carriage transversely of the vehicle to oppose static and dynamic overturning moments applied to the vehicle.

Another earlier solution is described in U.S. Pat. No. 3,277,840 which discloses a vehicle stabilization system which tilts the vehicle in the appropriate direction to oppose a disturbance torque.

Still another earlier solution is described in U.S. Pat. No. 3,373,832 wherein a manually-operated steering wheel displaces a gyro gimbal, and a reaction torque is employed to turn the steerable wheel.

SUMMARY OF THE INVENTION

The present invention provides apparatus for roll-stabilizing a vehicle.

The inventive apparatus broadly comprises sensing means, such as a compound physical pendulum, mounted on the vehicle for sensing the application of an overturning moment to the vehicle in terms of the vehicle's lateral acceleration and in terms of the vehicle's angular acceleration about a roll axis; an inertia wheel mounted on the vehicle for rotation about an axis parallel to the longitudinal axis of the vehicle; and motor means, such as a hydraulic motor, mounted on the vehicle and operable in response to the sensing means for accelerating the inertia wheel in the appropriate angular direction to cause the inertia wheel to exert a reaction torque on the vehicle to oppose the applied overturning moment.

In the preferred embodiment, the compound physical pendulum includes a rigid dumbbell-shaped member having a relatively small upper mass, a relatively large lower mass, and an intermediate flapper member. Desirably, this dumbbell-shaped member is mounted on a spring rate-cancelled flexure tube for substantially frictionless pivotal movement. However, persons skilled in this art will appreciate that other functionally equivalent devices may be used to provide such a compound physical pendulum. One example of such an alternate device would be a cylindrical mass mounted for rotation about an axis parallel to but spaced from the axis of the cylinder.

The flapper may be operatively interposed between the opposed nozzles of a hydraulic amplifier such that the amplifier will produce a differential control pressure in response to flapper movement. Such differential control pressure is employed to operate a proportional servovalve providing a hydraulic drive pressure output. Such drive pressure is supplied to a hydraulic motor which in turn accelerates the inertia wheel in the appropriate angular direction to exert a reaction torque on the vehicle to oppose and cancel the applied overturning moment.

The apparatus may further include static balance means for shifting a weight or fluid mass transversely of the vehicle to correct a static imbalance condition. This weight or fluid mass may be an operational part of the vehicle itself, or an additional weight or mass expressly provided for this purpose. In the preferred embodiment, this means is relatively insensitive to high frequency variations in the drive pressure.

Accordingly, the general object of the invention is to provide apparatus for sensing the angular and lateral acceleration of a vehicle caused by application of an overturning disturbance moment, torque, or side load, and to apply an opposite or restoring reaction torque to the vehicle to stabilize the vehicle against roll acceleration.

Another object is to provide such roll-stabilizing apparatus having unique means for sensing the lateral and angular acceleration of the vehicle.

Another object is to provide such roll-stabilizing apparatus having unique means for mounting a compound physical pendulum for substantially frictionless pivotal movement.

Another object is to provide such roll-stabilizing apparatus having means for correcting a static or quasi-static torque imbalance.

These and other objects and advantages will become apparent from the foregoing and ongoing specification, the drawings, and the appended claims.

DESCRIPTION OF THE PREFERRED EMBODIMENTS

Figure 1:
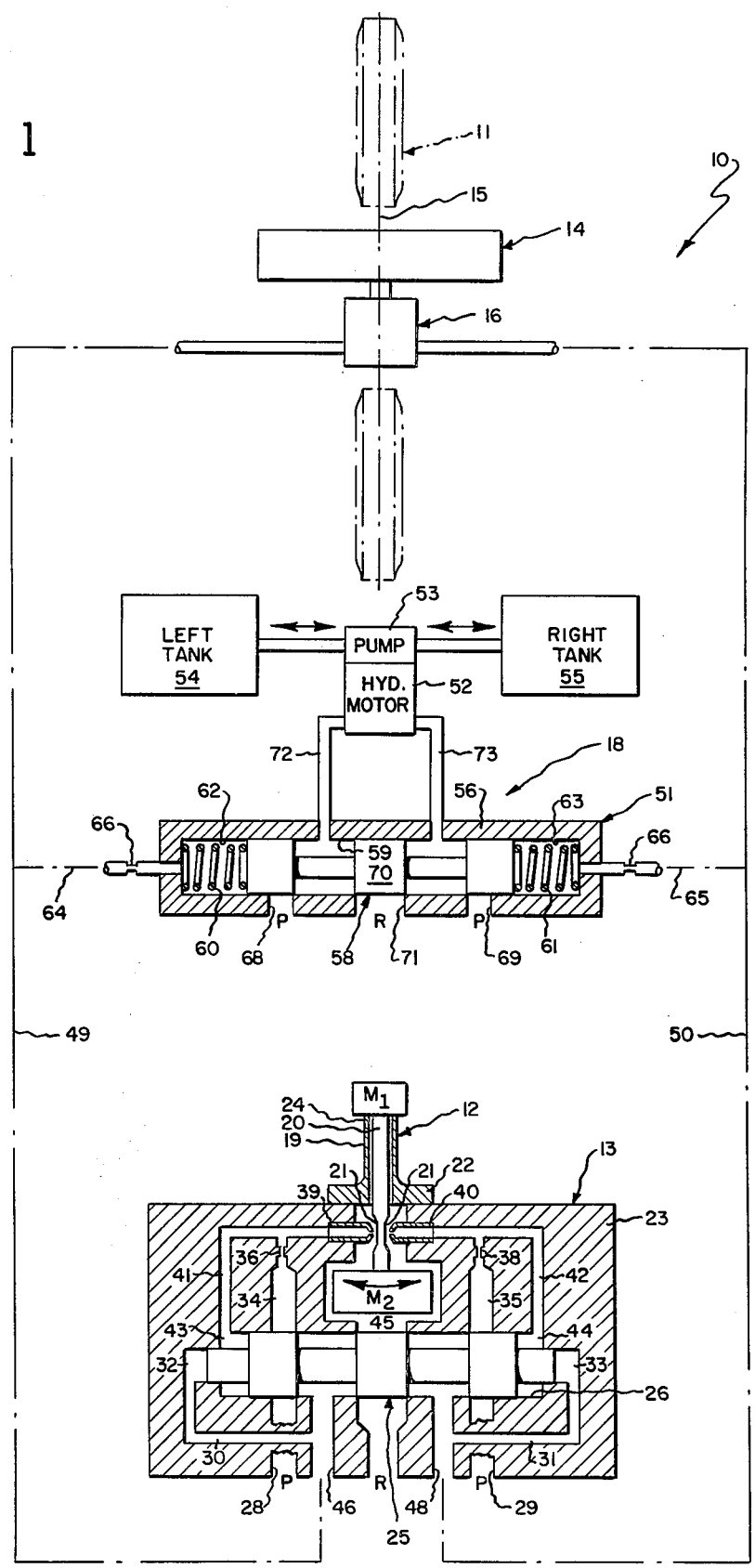
FIG. 1 is a schematic view of the structure of the inventive apparatus, this view depicting the vehicle in top plan and illustrating the weight-shift means and the servovalve in transverse vertical section.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the several drawing figures, and more particularly to FIG. 1 thereof, the present invention broadly provides apparatus, of which one preferred embodiment is generally indicated at 10, for roll-stabilizing a vehicle, such as a motorcycle, schematically illustrated at 11. However, while the inventive apparatus is illustrated and described herein in association with a motorcycle, it should be clearly understood that such apparatus may be used in association with other vehicles, including, but not limited to, automobiles, trucks, trailers and the like. Hence, it is apparent that the term "vehicle," as used herein, is intended in its generic sense.

STRUCTURE (FIG. 1)

As best shown in FIG. 1, the presently preferred embodiment of apparatus 10 broadly includes a compound physical pendulum 12 operatively associated with a pressure control servovalve, generally indicated at 13; a cylindrical flywheel or inertia wheel 14 mounted on the vehicle 11 for rotation about a horizontal axis parallel to the longitudinal centerline 15 of the vehicle and arranged to be rotated in either angular direction by motor means, such as a hydraulic motor 16, when supplied with fluid from servovalve 13; and static balance means, generally indicated at 18, for shifting a weight or fluid transversely of the vehicle to correct static and quasi-static imbalance conditions.

The compound physical pendulum 12 comprises a rigid dumbbell-shaped member operatively mounted on the upper end of a flexure tube 19. The dumbbell-shaped member is shown as including a relatively small upper mass $M_1$, a relatively large lower mass $M_2$, and an intermediate flapper member 20 provided with a pair of opposite planar target surfaces, severally indicated at 21, for a purpose hereinafter explained. The flexure tube 19 is of the type disclosed in U.S. Pat. Nos. 3,023,782 and 3,228,423, the aggregate disclosures of which are hereby incorporated by reference to amplify the description of the structure and operation of such flexure tube. The lower thickened base portion 22 of flexure tube 19 is suitably mounted on the body 23 of servovalve 13, and its upper marginal end portion 24 is secured to the dumbbell-shaped member immediately beneath upper mass $M_1$. Preferably, the flapper supports an armature (not shown) operatively interposed between polepieces of a permanent magnet, so as to effectively cancel the spring rate of the flexure tube. This feature of "rate cancellation" is more fully disclosed in the aforesaid U.S. Pat. Nos. 3,023,782 and 3,228,423. Hence, flexure tube 19 may be regarded as having a substantially zero spring rate, and the effect of this is tantamount to providing a substantially frictionless pivotal mounting of the rigid dumbbell-shaped member on the valve body 23.

The servovalve 13 is generally of the type disclosed in U.S. Pat. No. 2,931,389, the aggregate disclosure of which is also incorporated by reference. This valve 13 is shown as including a three lobed valve spool, generally indicated at 25, slidably mounted within a horizontally-elongated cylindrical bore 26. When the valve spool 25 is centered, as shown in FIG. 1, pressurized hydraulic fluid supplied to left and right valve inlet ports 28, 29 will be delivered through left and right passageways 34, 35, containing restricted orifices 36, 38, to left and right nozzles 39, 40, respectively. The pressure of fluid discharged through these nozzles 39, 40 will be applied through passageways 41, 42 to left and right annular spool drive chambers 43, 44, respectively. Fluid discharged through nozzles 39, 40 upon the opposite target surfaces 21, 21 communicates with return through a common sump passageway 45. When the valve spool is in its centered position, the left spool lobe blocks communication of left inlet port 28 with left outlet port 46, and the right spool lobe blocks communication of right inlet port 29 with right outlet port 48. The pressure of fluid exiting the servovalve through left and right outlet ports 46, 48 will be applied through passageways 30, 31 to the left and right spool end chambers 32, 33, respectively. The left and right inlet ports 28, 29 are connected to a suitable source (not shown) of fluid, preferably pressurized by a pump driven by the vehicle's engine. The outlet ports 46, 48 are shown connected to opposite sides of hydraulic motor 16 through left and right conduits 49, 50, respectively.

Hence, when the flapper target surfaces are equidistant from the nozzles, as shown, equal pressures (i.e., a zero differential control pressure) will be applied to the spool drive chambers 43, 44 so that the valve spool will remain in its centered position, and there will be no flow through conduits 49, 50.

If the flapper now moves toward the left nozzle 39, a positive pressure differential will be applied to left drive chamber 43, displacing the valve spool rightwardly and communicating right inlet port 29 with right outlet port 48. The pressure in outlet port 48 will be applied to the spool right end chamber 33 through passageway 31 to provide a leftward restoring force which urges the spool to move to a position at which the differential output pressure will be proportional to the differential control pressure from the hydraulic amplifier. At the same time, fluid will be supplied to the hydraulic motor 16 through right conduit 50, and left conduit 49 will be communicated with valve return passageway 45. Therefore, such leftward movement of the flapper will cause the valve spool to shift rightwardly to supply fluid through right conduit 50 to accelerate the hydraulic motor and flywheel in one angular direction.

On the other hand, if the valve spool is centered and the flapper moves toward right nozzle 40, the servovalve will operate conversely to accelerate the hydraulic motor and flywheel in the opposite angular direction.

The static balance means 18 is shown as broadly including a valve 51, a hydraulic motor 52 operatively arranged to drive a pump 53, and left and right fluid tanks 54, 55 communicating with the pump.

Valve 51 includes a body 56, and a three-lobed valve spool, generally indicated at 58, slidably mounted within a horizontally-elongated cylindrical bore 59 provided in body 56. The spool 58 is biased toward its centered position, as shown in FIG. 1, by means of coil springs 60, 61 operatively arranged within the left and right spool end chambers 62, 63, respectively. Left and right branch conduits 64, 65, each containing a restricted orifice 66, communicate left and right conduits 49, 50 with spool end chambers 62, 63, respectively. Hence, a pressure differential between conduits 49, 50 will cause the valve spool 58 to move in the appropriate direction. At the same time, restrictive orifices 66 function to filter out high frequency pressure differentials between conduits 49, 50 so as to render the balancing mechanism responsive to static and quasi-static imbalances, but relatively insensitive to high frequency dynamic imbalance.

When the valve spool 58 is in its centered position, the left and right spool lobes cover and block left and right inlet ports 68, 69, respectively, and the center spool lobe 70 blocks return port 71. In this condition, there is no fluid flow to hydraulic motor 52 through conduits 72 or 73.

If servovalve 13 is operated such that conduit 49 functions as the supply conduit, a positive pressure differential will exist in left spool end chamber 62 to displace the valve spool rightwardly. When the valve spool is so displaced, fluid will be supplied to hydraulic motor 52 from a suitable source (not shown) through inlet port 69 and passageway 73. At the same time, passageway 72 will communicate with return port 71.

Hence, when the valve spool 58 is moved rightwardly from its neutral position, fluid will be supplied through passageway 73 to rotate the hydraulic motor 52 and pump 53 in one angular direction.

On the other hand, if servovalve 13 is operated such that conduit 50 functions as the supply conduit, a positive pressure differential will exist in right spool end chamber 63 to displace valve spool 58 leftwardly from its centered position. When the valve spool is so displaced, fluid will be supplied to hydraulic motor 52 from the source (not shown) through inlet port 68 and passageway 72. Of course, in this condition, passageway 73 will communicate with return port 71. Therefore, when the valve spool is moved leftwardly from its neutral position, fluid will be supplied through passageway 72 to rotate hydraulic motor 52 and pump 53 in the opposite angular direction.

Such operation of pump 53 causes fluid to be correspondingly transferred through conduits 74, 75 between the left and right tanks 54, 55. Of course, such fluid is shifted in this manner so that the weight of same will tend to oppose and counter a static imbalance applied to the vehicle. The present invention further contemplates that instead of a fluid, a weight could be alternatively shifted transversely of the vehicle to counter a static imbalance condition. Moreover, such weight or fluid need not necessarily be extraneous to the operational components of the vehicle. For example, such means also contemplates the shifting of a vehicle wheel along its axle, or the transfer of fuel between two tanks. Hence, the invention contemplates great latitude in determining what particular mass may be moved to correct such imbalance condition.

OPERATION (FIG. 2)

Figure 2:
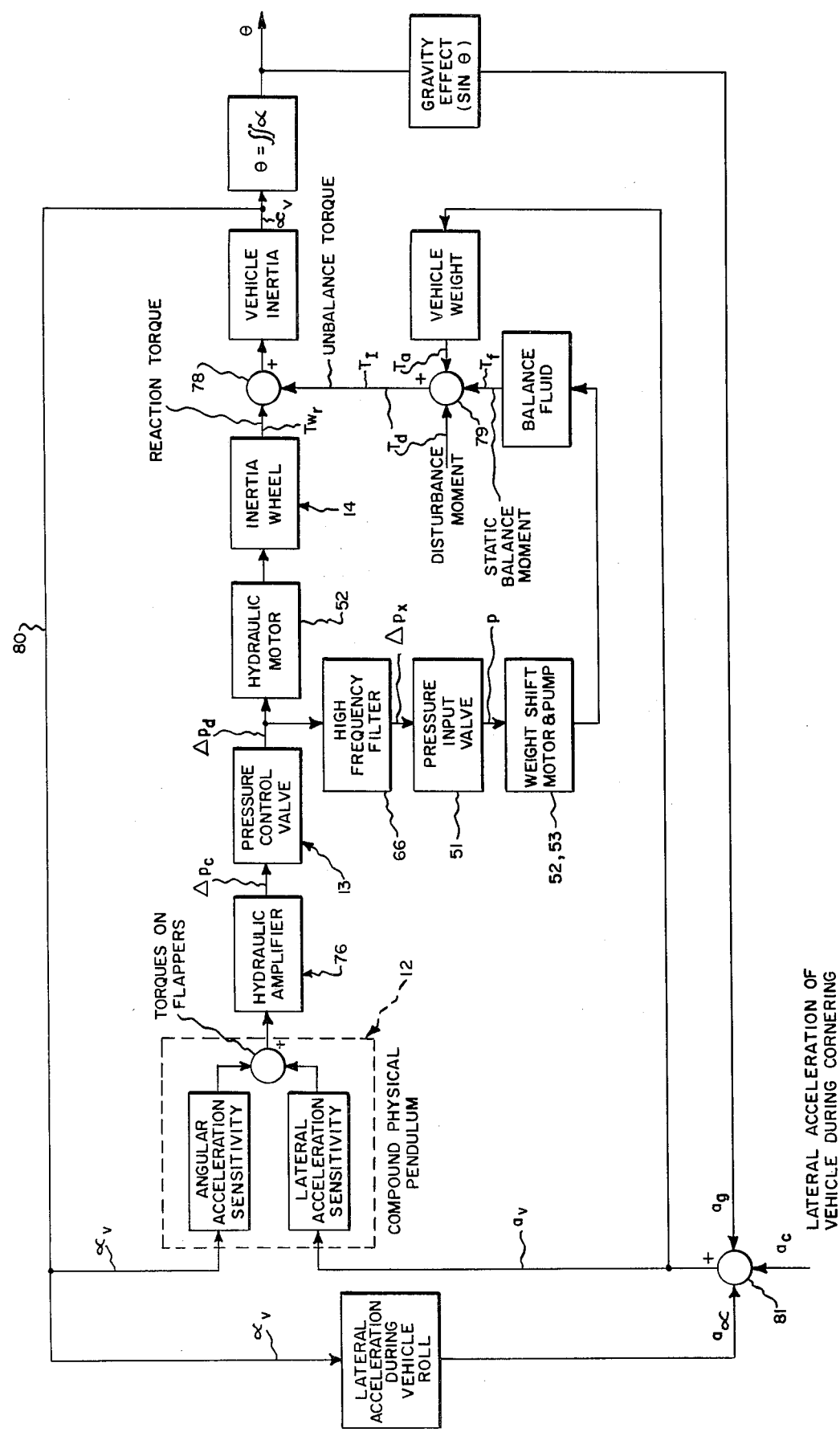
FIG. 2 is a block diagram illustrating the operation of the structure depicted in FIG. 1.

The operation of the inventive apparatus is schematically depicted in the block diagram of FIG. 2.

In FIG. 2, the compound physical pendulum 12 is illustrated as having a particular sensitivity to angular acceleration ($\alpha_v$), and a particular sensitivity to lateral acceleration ($a_v$). The net torque on the flapper will be the resultant summation of the torques created by the angular acceleration of the vehicle about its roll axis, and the lateral acceleration of the vehicle. The sensitivity of the pendulum to lateral acceleration will be somewhat dependent upon the location of the pendulum relative to the roll axis and the physical parameters of the pendulum.

Lateral acceleration will result from several effects, including: (a) gravitational acceleration due to the angle of vehicle roll from the vertical, (b) centrifugal acceleration due to vehicle cornering, and (c) lateral acceleration associated with rolling of the vehicle because the pendulum is spaced from the roll axis. This latter acceleration effect will be proportional to the offset distance of the compound pendulum from the roll axis.

The sensitivity of the compound pendulum to lateral accelerations is related to the net unbalance between masses $M_1$ and $M_2$, without regard to which mass is relatively the larger. The polarity of this sensitivity will be established by the larger of the two masses.

The roll-stabilization system is arranged so that gravitational and centrifugal lateral acceleration effects will produce corrective, or stabilizing, reaction torques to be exerted by the inertia wheel on the vehicle. The response to lateral acceleration due to rolling will then be inherently destabilizing. However, the larger of the two masses can be selected so that the angular acceleration sensitivity of the compound pendulum will offset in both polarity and magnitude the undesirable destabilizing effect of lateral acceleration associated with rolling of the vehicle.

The sensitivity and polarity of the compound pendulum to angular acceleration is related to the summation of both masses operating through their respective moment arms about the pivotal axis, without regard to which mass is the larger.

The effect of the net torque exerted by the compound pendulum on the flapper will urge the flapper to move closer to one of the nozzles against the force of fluid pressure contained in such nozzle by the proximity of the flapper.

This net torque exerted on the flapper is amplified by hydraulic amplifier 76, which in turn supplies a proportional differential control pressure ($\Delta p_c$) to drive chambers 43, 44 of valve 13 to displace the valve spool 25 in the appropriate direction.

When the valve spool 25 has been so displaced, valve 13 will produce a proportional hydraulic output differential pressure ($\Delta P_d$) between conduits 49 and 50, which pressure will be supplied to the hydraulic motor 52. Such hydraulic input to motor 52 will apply a proportional torque to inertia wheel 14.

Since torque is related to angular acceleration according to the general formula:
$$T_w = I_w \alpha_w$$
where
$T_w$ = torque exerted by the hydraulic motor on the inertia wheel;
$I_w$ = moment of inertia of the flywheel; and
$\alpha_w$ = angular acceleration of the flywheel; such torque applied by hydraulic motor 52 will cause the inertia wheel to be accelerated in the appropriate angular direction. At the same time, such acceleration of flywheel 14 will produce an equal and opposite reaction torque on the vehicle 11. Summing point 78 is arranged to receive the reaction torque ($T_{wR}$) exerted by the accelerating inertia wheel on the vehicle, and a vehicle imbalance torque ($T_I$) supplied from summing point 79.

The output of summing point 78 represents the net torque ($T_v$) applied to the vehicle, and such net torque will produce an angular acceleration of the vehicle according to the formula:
$$\alpha_v = T_v / I_v$$
where
$T_v$ = the net roll torque applied to the vehicle;
$I_v$ = the roll moment of inertia of the vehicle; and
$\alpha_v$ = the resultant angular acceleration of the vehicle about its roll axis.

Such vehicle roll acceleration ($\alpha_v$) is supplied via feedback loop 80 as an input signal to the angular acceleration sensitivity of the compound physical pendulum 12.

The angular position of the vehicle from the vertical at any instant in time is the double integral of the vehicle's roll acceleration. Persons skilled in this art will appreciate that when the vehicle is in a roll-tilted position, the pendulum will sense an apparent lateral acceleration due to gravity. This apparent lateral acceleration due to gravity, $a_g$, will be directly proportional to the sine of the included angle ($\theta$) between the true vertical and the vehicle's apparent vertical centerline. Another apparent lateral acceleration effect, $a_\alpha$, will be created by the actual roll acceleration due to the offset location of the pendulum from the roll axis. Other lateral acceleration effects, including acceleration due to vehicle cornering, are represented by $a_c$. The net lateral acceleration of the vehicle, $a_v$, as sensed by the pendulum, will be the summation of the various lateral acceleration effects supplied to summing point 81.

The product of this net lateral acceleration ($a_v$) times the mass of the vehicle may be regarded as a lateral force exerted on the vehicle at its center of gravity. Of course, this force will act at a moment arm distance (y) from the point of contact of the vehicle's wheels with the ground (i.e., the roll axis). Accordingly, the torque attributable to the net lateral acceleration may be calculated according to the formula: $T_a = M_v a_v y$
where $T_a$ = roll torque attributable to net lateral acceleration;
$M_v$ = mass of vehicle
$a_v$ = net lateral acceleration of vehicle
y = moment arm between point of contact with ground and vehicle's center of gravity When servovalve 13 supplies fluid to hydraulic motor 16, fluid will be supplied to valve 51 through either conduit 64 or conduit 65. Since both conduits contain a restrictive orifice 66 to filter out the high frequency pressure variations, a quasi-static differential pressure ($\Delta p_x$) will be supplied to the spool end chambers. This differential pressure ($\Delta p_x$) will displace valve spool 58 appropriately, and will supply line pressure (p) to hydraulic motor 52 to drive pump 53. Such operation of pump 53 will continue to shift fluid between tanks 54 and 55 whenever a static or quasi-static differential pressure is present. The effect of the relative weights of fluid in tanks 54, 55, each acting at an arm distance from the vehicle's longitudinal centerline, will be a torque ($T_f$) exerted on the vehicle. This torque is supplied to summing point 79, where it is summed with the lateral acceleration torque, $T_a$, and any external disturbance torque, $T_d$, to provide a resultant or net torque imbalance, $T_I$, which is supplied to summing point 78.

Accordingly, the inventive apparatus 10 broadly comprises sensing means, such as compound physical pendulum 12, mounted on the vehicle for sensing the application of an overturning moment to the vehicle in terms of the vehicle's lateral acceleration and in terms of the vehicle's angular acceleration about a roll axis; an inertia wheel 14 mounted on the vehicle for rotation about an axis parallel to the longitudinal axis of the vehicle; and motor means, including hydraulic motor 16, mounted on the vehicle and operable in response to the sensing means for accelerating the inertia wheel in the appropriate angular direction to cause the inertia wheel to exert a reaction torque on the vehicle to oppose the overturning moment.

Of course, many changes and substitutions may be made, and persons skilled in this art will appreciate that an operative compound pendulum may assume many forms. For example, a uniquely configured weight could be mounted on an overhead-supported flexible vertical reed such that one portion of such weight (analogous to mass $M_1$) is arranged above the flexure pivot, and another portion thereof (analogous to mass $M_2$) is arranged below and flexure pivot. This, or other operative compound pendulums, may be further provided with a suitable transducer to measure the force exerted on the pendulum, or the position of the pendulum. Moreover, while presently preferred form of apparatus 10 is shown as being an electro-hydraulic system, persons skilled in this art will appreciate that one or more components of the apparatus could be replaced by their mechanical equivalents. Hence, the apparatus may be of the electro-mechanical or electro-pneumatic type, as well as the electro-hydraulic type.

Therefore, while the preferred embodiment of the present invention has been shown and described, persons skilled in this art will appreciate that various additional changes and modifications may be made without departing from the spirit of the invention, which is defined in the following claims.

What is claimed is:

1. Apparatus for roll-stabilizing a vehicle, comprising:
   sensing means mounted on said vehicle for sensing the application of an overturning moment to said vehicle in terms of said vehicle's lateral acceleration and in terms of said vehicle's angular acceleration about a roll axis;
   static balance means operable in response to said sensing means for shifting a weight transversely of said vehicle to correct a static imbalance of said vehicle, said static balance means including filter means operatively arranged to filter out high frequency variations in the parameters sensed by said sensing means;
   an inertia wheel mounted on said vehicle for rotation about an axis parallel to the longitudinal axis of said vehicle; and
   motor means mounted on said vehicle and operable in response to said sensing means for accelerating said inertia wheel in the appropriate angular direction to cause said inertia wheel to exert a reaction torque on said vehicle to oppose a dynamic overturning moment applied thereto.

2. The apparatus as set forth in claim 1 wherein said sensing means includes a compound physical pendulum.

3. The apparatus as set forth in claim 2 wherein said compound physical pendulum is mounted for substantially frictionless pivotal movement.

4. The apparatus as set forth in claim 3 wherein said compound physical pendulum is mounted on a rate-cancelled flexure tube.

5. The apparatus as set forth in claim 3 wherein said compound physical pendulum includes a rigid dumb-bell-shaped member having a relatively small upper mass, a relatively large lower mass, and an intermediate flapper member.

6. The apparatus as set forth in claim 1 wherein said motor means includes a hydraulic motor arranged to accelerate said inertia wheel in response to a drive pressure, and valve means associated with said sensing means and operable to supply such drive pressure to said hydraulic motor.

7. The apparatus as set forth in claim 6 wherein said valve means includes a hydraulic amplifier associated with said sensing means and operable to supply a control pressure substantially proportional to the overturning moment acting on said vehicle, and wherein said valve means is arranged to provide said drive pressure in response to said control pressure.

8. The apparatus as set forth in claim 6 wherein said static balance means includes a second valve arranged to sense said drive pressure and operable to pump fluid transversely of said vehicle to correct a static imbalance of said vehicle.

* * * * *